United States Patent [19]
Turley et al.

[11] Patent Number: 5,940,804
[45] Date of Patent: *Aug. 17, 1999

[54] COMPUTER EXECUTABLE WORKFLOW RESOURCE MANAGEMENT SYSTEM

[76] Inventors: William N. Turley, 8086 Finlandia Way, Sandy, Utah 84093; Verlyn D. Hawks, 930 S. 175 West, Bountiful, Utah 84010; Kenneth U. Gibson, 2960 S. 3095 West, West Valley City, Utah 84119

[*] Notice: This patent issued on a continued prosecution application filed under 37 CFR 1.53(d), and is subject to the twenty year patent term provisions of 35 U.S.C. 154(a)(2).

[21] Appl. No.: 08/769,298

[22] Filed: Dec. 18, 1996

[51] Int. Cl.⁶ ..................................................... G06F 11/22

[52] U.S. Cl. .................................. 705/9; 707/2; 707/102

[58] Field of Search ................................... 705/9, 11, 22, 705/28, 29; 707/2, 102, 200; 364/570, 571.04, 571.07, 571.08

[56] References Cited

U.S. PATENT DOCUMENTS

| | | | |
|---|---|---|---|
| 5,168,444 | 12/1992 | Cukor et al. | 364/401 |
| 5,182,705 | 1/1993 | Barr et al. | 364/401 |
| 5,191,522 | 3/1993 | Bosco et al. | 364/401 |
| 5,191,525 | 3/1993 | LeBrun et al. | 364/419 |
| 5,208,748 | 5/1993 | Flores et al. | 364/419 |
| 5,446,740 | 8/1995 | Yien et al. | 370/110.1 |

OTHER PUBLICATIONS

Workflow Management Coalition "Workflow Management Coalition Terminology & Glossary" Jun. 1996 Issue 2.0 pp. 1–59.

*Primary Examiner*—Thomas Peeso
*Attorney, Agent, or Firm*—Fish & Richardson P.C.

[57] ABSTRACT

A computer system executable method is provided for managing resources in an automated workflow system for manipulating a work item, the work item being stored in a database of work items for subsequent execution by an operator and meeting a predetermined criteria. A first definitional data item is stored in a memory, the first definitional data item affecting how the workflow system processes work items meeting the predetermined criteria. A directive is received from an administrator to remove the first definitional data item from the memory. A mark is set, the mark being associated with the first definitional data item to indicate that the first definitional data item is to be removed from the memory. If a second definitional data item is normally able to be made dependent on the first definitional data item, the mark is used to prevent the second definitional data item from being made dependent on the first definitional data item after the mark was set. The mark is used to prevent the first definitional data item from affecting another work item if the other work item failed to meet the predetermined criteria until after the mark was set. The work item is processed until the work item no longer meets the predetermined criteria. It is determined whether any other definitional data items are dependent on the first definitional data item. Depending on the outcome of the determination, the first definitional data item is removed from the memory.

35 Claims, 6 Drawing Sheets

| PROCESSES | | | |
|---|---|---|---|
| PROCESS ID | 1 | 2 | |
| NODES (STEPS) | A | A | |
| | B | C | |
| | D | D | |
| | F | E | |
| DEL MK | | | |

FIG. 4B

| NODES | | | | | |
|---|---|---|---|---|---|
| NODE ID | A | B | C | D | E |
| PROCESSES | 1 | 1 | 2 | 1 | 2 |
| | 2 | 3 | 3 | 2 | |
| | 4 | 6 | 4 | 4 | |
| | 5 | 8 | 8 | 7 | |
| DEL MK | | | | | |

COMPUTER EXECUTABLE WORKFLOW RESOURCE MANAGEMENT SYSTEM

BACKGROUND OF THE INVENTION

The invention relates generally to computer executable workflow management and control systems and more particularly to computer system executable methods for use in an automated workflow system.

As is known in the art, members of an organization are provided work items for execution from a database of unexecuted work items. These work items represent tasks such as filling out documents, returning telephone calls to potential or existing customers, initiating transactions, or similar duties. Work items may arrive at the database from outside the organization or from inside the organization or both. For example, if the organization provides financial services, the work items may relate to client account maintenance, buy and sell orders, internal management directives, and the like.

Efficiency gains can be accomplished by implementing a workflow management system that automates a process for distributing the work items to the members. In the workflow management system, each member is an operator situated at a computer station, such as a personal computer. The computer stations are connected to a computer system running a workflow application program. After an assigned work item is completed, a new work item is provided from the database to the computer station in response to a request from the computer station.

The work items are processed in the workflow management system in accordance with definitional data items typically specified by one of the operators serving as an administrator of the workflow management system. Such definitional data provides components of the workflow management system including one or more processes defining steps for manipulating a work item in the workflow management system, one or more nodes representing discrete manipulation tasks corresponding to the steps of the process, and rules affecting how the work item is processed in the workflow management system.

As is known in the art, the workflow management system is treated in one of two ways if one of the definitional data items is to be deleted in order to alter the functional characteristics of the workflow management system or in order to conserve the workflow management system's memory resources. In the first way, the definitional data item is deleted without regard for issues such as whether any work items are presently using the definitional data item or whether another definitional data item remains dependent on the definitional data item. This first way can lead to unpredictable mishandling of work items because the integrity of the workflow management system is not necessarily preserved. For example, if the definitional data item controls how particular work items are displayed, such work items cannot be displayed properly if the definitional data item is deleted.

In the second way, to preserve the integrity of the workflow management system, the operation of the workflow management system is suspended and such issues are resolved before the definitional data item is deleted. Such a suspension of the operation of the workflow management system affects not only work items presently using the definitional data item but also other work items including work items unrelated to the definitional data item. This second way also requires such a suspension every time a definitional data item is deleted. These suspensions slow down the operation of the workflow management system.

SUMMARY OF THE INVENTION

In accordance with one aspect of the invention, a computer system executable method is provided for use (e.g., in managing resources such as memory storage space) in an automated workflow system. The method includes determining (e.g., by receiving a directive from an operator serving as an administrator) that a definitional data item should be removed from a memory. The definitional data item defines at least a part of the operation of the workflow system. The definitional data item is retained in the memory until the workflow system becomes sufficiently independent of the definitional data item. The workflow system may become sufficiently independent of the definitional data item when the workflow system has fewer than a predetermined quantity of work items (e.g., one work item) requiring use of the definitional data item. The definitional data item may define predetermined criteria and the pending work items may require use of the definitional data item if the pending work items meet the predetermined criteria. The method having this feature allows the administrator to select the definitional data item for eventual removal even if one or more work items presently require use of the definitional data item. Without further intervention by the administrator, the method having this feature retains the definitional data item as long as use of the definitional data item is required by work items.

The method allows the workflow system to conserve memory resources unintrusively (e.g., without disturbing the integrity of the workflow system and without suspending the operation of the workflow system). The administrator of the workflow system need not wait until it is no longer dependent on the definitional data item before selecting the definitional data item for eventual removal from memory. For example, if the definitional data item is a rule controlling work items meeting the predetermined criteria, the administrator need not wait until there are no such work items pending. With the method, the administrator can request such removal as soon as the administrator decides such removal is warranted, such as when the administrator needs to clear memory storage space or when the administrator wishes to alter the functional characteristics of the workflow management system (e.g., by deleting a rule controlling how a work item is displayed or transferred). To make sure such removal from memory does not occur prematurely, the workflow system then automatically keeps track of how the workflow system is dependent on the definitional data item (e.g., by determining periodically whether work items that met the predetermined criteria when removal was requested are still pending).

Implementations of this aspect of the invention may include one or more of the following features. The workflow system may become sufficiently independent of the definitional data item when another definitional data item becomes sufficiently independent of the definitional data item (e.g., when a process is changed to exclude a step or node previously included or when a rule is changed to disassociate the rule from a node). Provided with the method having this feature, the administrator is able to request eventual removal of the definitional data item from memory even if the other definitional data item presently depends on the definitional data item. For example, even if a particular process presently depends on a particular node (e.g., the particular node represents a purchasing department and a step of using the purchasing department is still required in the particular process), the administrator can mark the node to indicate that the node should be eventually removed.

Without further intervention by the administrator, the method with the feature then ensures that the definitional data item is retained as long as required by such dependence (e.g., that the particular node representing the purchasing department is retained as long as the particular process requires the step of using the purchasing department).

At least one of the definitional data items may have an identifier (e.g., identifying the other definitional data item such as a node or a process). A reference using the identifier may link one of the definitional data items to the other definitional data item. The other definitional data item may become sufficiently independent of the definitional data item when the reference is removed. As a result of the method having this feature, eventual removal can be requested presently even if a reference presently links the definitional data items. Then, without further intervention by the administrator, the definitional data item is retained until the reference is removed.

A nodes table (i.e., a data structure listing a repertoire of nodes available for use in one or more processes for manipulating work items and which may correspond to departments of an organization), a rules table, or a work items table may include the definitional data item. A processes table, a nodes table, or a rules table may include the other definitional data item. For example, the processes table may specify that a particular work item be manipulated first by a purchasing department, then by a shipping department, and finally by an accounts receivable department. Each of these departments may be represented by a definitional data item defining a node in the nodes table. Similarly, work item definitional data items (e.g., defining types of work items and how such work items are displayed) and rule definitional data items (e.g., controlling the transfer of work items from node to node) are stored and are associated with such nodes.

The method may further include using the definitional data item as a new definitional data item (i.e., recycling the definitional data item). As a result of the method having this feature, the performance of the workflow system is improved because the definitional data item is re-used. Such re-use allows the workflow system to avoid expending processing resources to create the new definitional data item.

A rules table may include the definitional data item. The predetermined criteria may be defined at least in part by the definitional data item. The method having this feature allows the administrator to request removal even if the definitional data item is included in a rule definition still to be used in connection with one or more pending work items.

In accordance with another aspect of the invention, another computer system executable method is provided (e.g., for managing resources) in an automated workflow system. A definitional data item is stored in a memory. The definitional data item defines at least a part of the operation of the workflow system. It is determined that the definitional data item should be removed from the memory. The definitional data item is retained in the memory until the workflow system becomes sufficiently independent of the definitional data item. The definitional data item is removed from the memory.

With this method, the workflow system conserves memory resources unintrusively. The method allows the administrator to request such removal at any time, without concern for how dependent the workflow system is on the definitional data item. Without further intervention by the administrator, actual removal is delayed until after the workflow system achieves sufficient independence from the definitional data item.

In accordance with another aspect of the invention, another computer system executable method is provided (e.g., for managing resources) in an automated workflow system for manipulating a work item, the work item being stored in a database of work items for subsequent execution by an operator and meeting a predetermined criteria. A first definitional data item is stored in a memory. The first definitional data item affects how the workflow system processes work items meeting the predetermined criteria. A directive is received from an administrator to remove the first definitional data item from the memory. A mark is set. The mark is associated with the first definitional data item to indicate that the first definitional data item is to be removed from the memory. If a second definitional data item is normally able to be made dependent on the first definitional data item, the mark is used to prevent the second definitional data item from being made dependent on the first definitional data item after the mark was set. The mark is used to prevent the first definitional data item from affecting another work item if the other work item failed to meet the predetermined criteria until after the mark was set. The work item is processed until the work item no longer meets the predetermined criteria. It is determined whether any other definitional data items are dependent on the first definitional data item. Depending on the outcome of the determination, the first definitional data item is removed from the memory.

Like the other methods, this method allows the workflow system to conserve memory resources unintrusively. This method allows the administrator to request removal at any time, without concern for whether other definitional data items or pending work items are dependent on the definitional data item to be removed. Without further intervention by the administrator, actual removal is put off until any such dependence is changed. At the same time, by use of the mark, the method prevents the subsequent creation of any additional dependency on the definitional data item, so that the mark may be removed as soon as possible after any existing dependency is sufficiently alleviated.

In accordance with another aspect of the invention, another computer system executable method is provided for use in processing work items in an automated workflow system. The method includes storing in a memory a definitional data item. The definitional data item affects how the workflow system processes the work items. A mark associated with the definitional data item is set to indicate that the definitional data item is to be removed from the memory. The mark is used to prevent the definitional data item from affecting one of the work items. The one of the work items is processed. The definitional data item is removed from the memory.

Implementations of this aspect of the invention may include the following feature. The method may further include using the mark to prevent the definitional data item from being associated with another definitional data item.

BRIEF DESCRIPTION OF THE DRAWINGS

Other features and advantages of the invention, as well as the invention itself, will become more readily apparent when read together with the following detailed description taken together with the accompanying drawings, in which.

DESCRIPTION OF THE PREFERRED EMBODIMENTS

Figure 1:
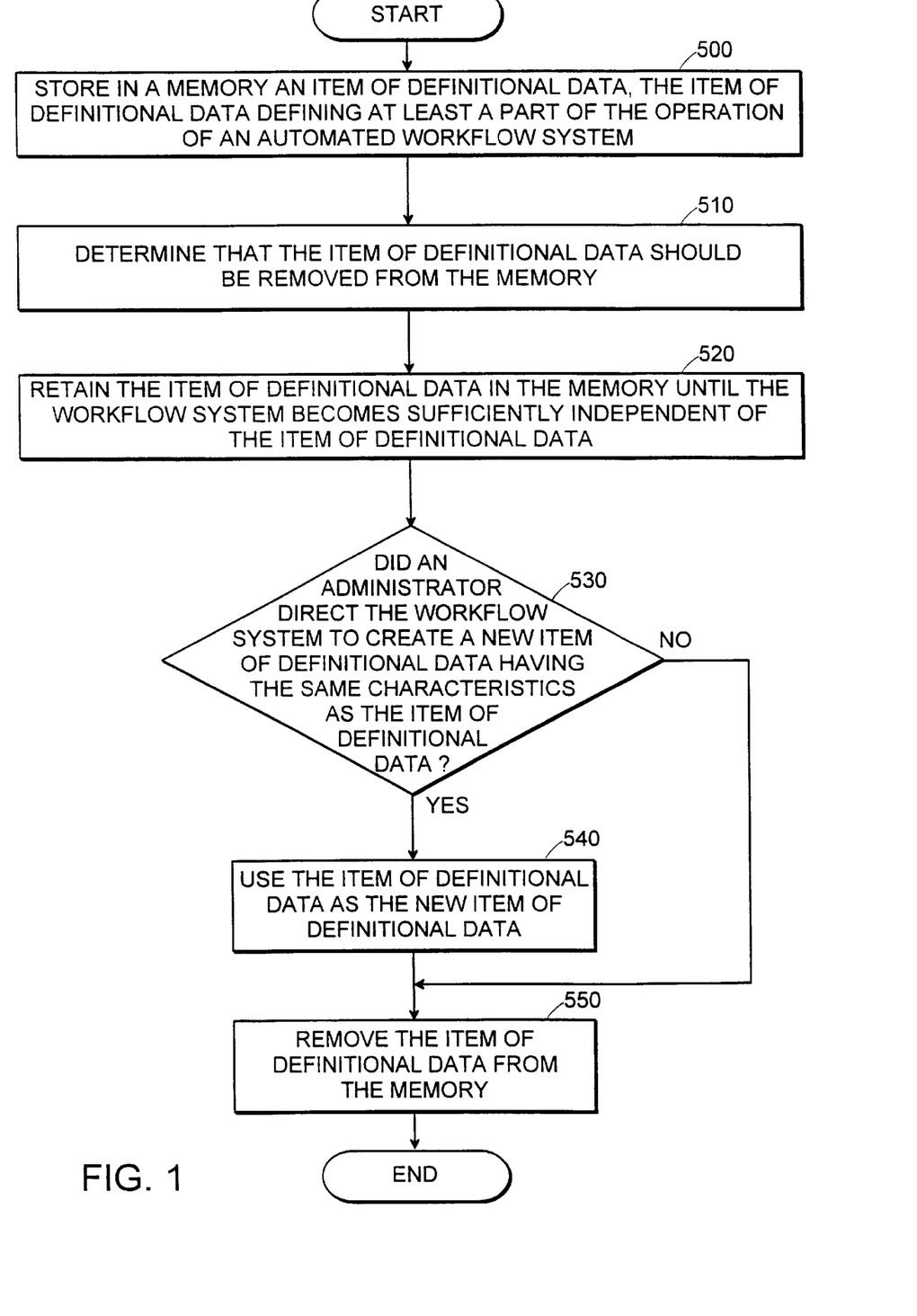
FIGS. 1–2 are flow diagrams of methods for use in an automated workflow system according to the invention.
Figure 3:
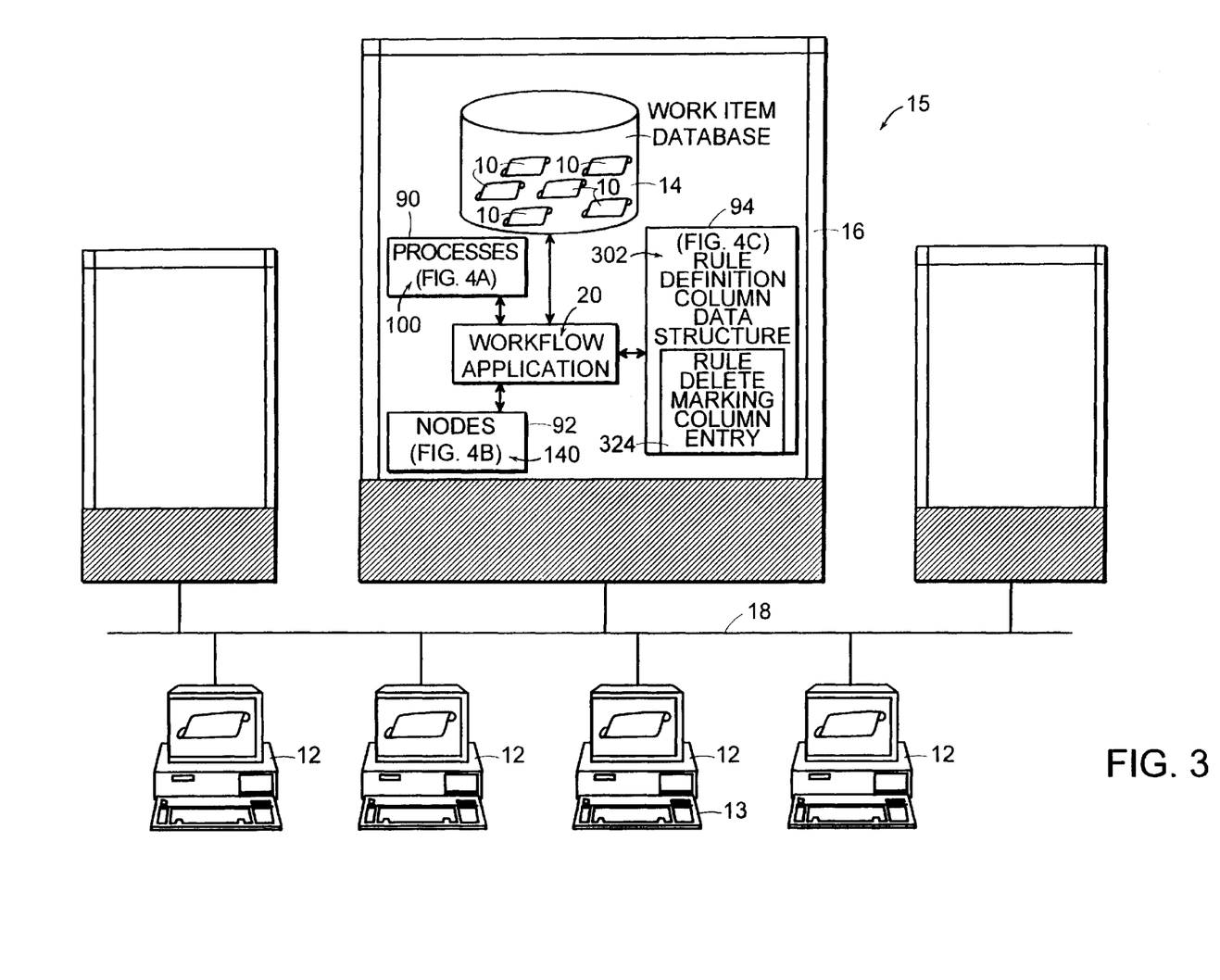
FIG. 3 is a block diagram of a computer system for execution of the methods of FIGS. 1–2 according to the invention.

Referring now to FIGS. 1 and 3, a computer system executable method is provided for use (e.g., in managing resources such as memory storage space) in an automated workflow system 15 implemented using the computer system 16. The workflow system 15 processes a work item 10 stored in a database 14 of work items 10 for subsequent execution by one of a plurality of operators (not shown) at one of a plurality of computer stations 12. The database 14 of work items 10 may be implemented using an Oracle® Pyramid® database system version 7.2. The computer system 16 may include a Pyramid® NILE™ computer having eight central processing units and two gigabytes of fast-access memory. Here, an operating system such as Data Center Operating System ("DC-OSx") runs on the computer system 16. The computer system 16 also runs a workflow application program 20 providing key functions used to provide the workflow management system as, for example, described by the Workflow Management Coalition in *Workflow Management Coalition Terminology & Glossary Issue* 2.0 (1996), incorporated by reference.

Each one of the computer stations 12 may be a personal computer running an operating system such as Microsoft® Windows® 3.1, Microsoft® Windows®95, or Microsoft® Windows® NT™. The computer system 16 and the computer stations 12 are interconnected across a bidirectional data connection bus 18 such as a network connection provided by a computer network using a TCP/IP protocol.

Figure 4A:
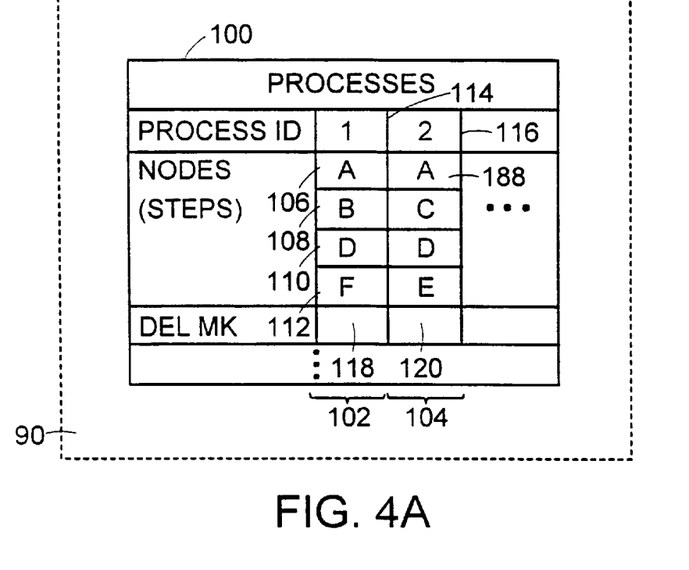
FIGS. 4A–4D are block diagrams of data structures used in the methods of FIGS. 1–2 according to the invention.
Figure 4B:
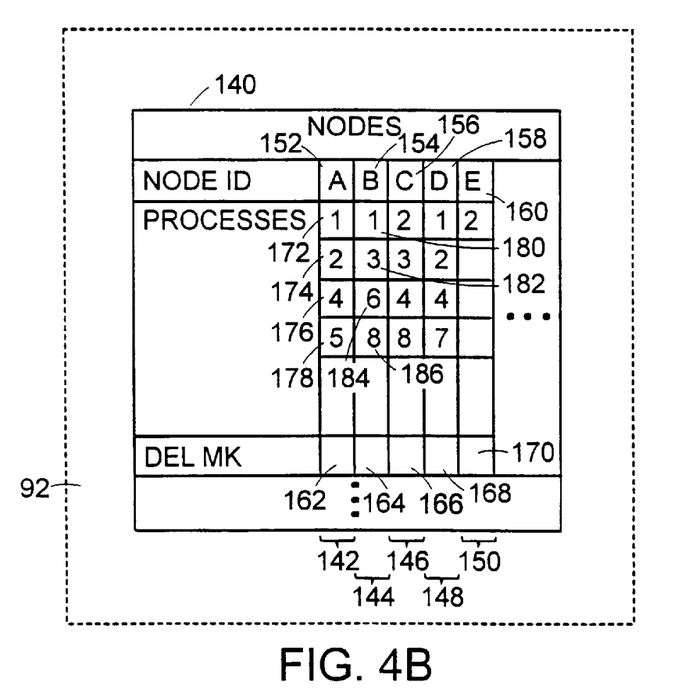
Figure 4C:
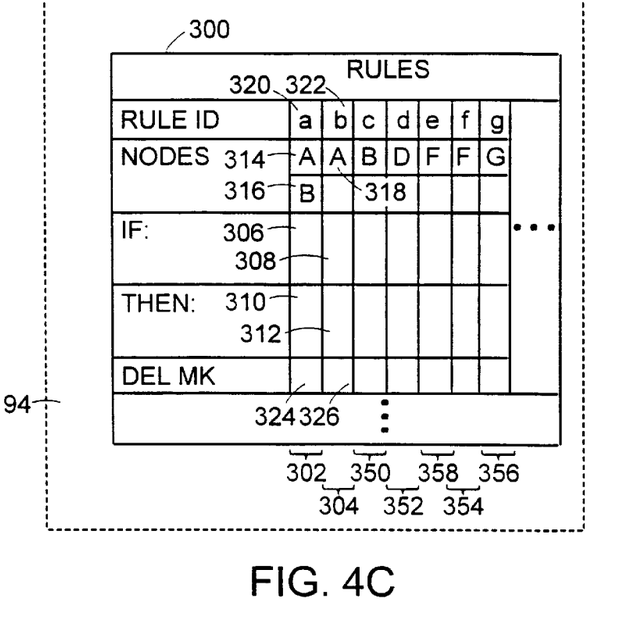

Referring also to FIGS. 4A–4C, memories 90, 92, 94, 96 are used to store a processes table 100 (FIG. 4A) and other data structures, here a nodes table 140, a rules table 300, and a queues table 400, for example, to be described below. As used herein, each of the memories 90, 92, 94, 96 may represent a memory section being physically separate from the others or may represent a logical section of an overall memory set of the computer system 16. In addition, as used herein, each of the memories 90, 92, 94, 96 may be made up of any type of data storage media and in fact may be made up of more than one type of data storage media, including volatile data storage media and non-volatile data storage media. Such data storage media types include but are not limited to semiconductor memory (e.g., dynamic RAM, static RAM), magnetic memory (e.g., magnetic tape, hard disk, floppy disk), optical memory (e.g., CD-ROM), and magneto-optical memory (e.g., writable optical disk).

Each table is made up of one or more database records such as a processes table column 102, described below. The processes table 100 has definitional data for one or more processes. Each process, here including a first process 102 and a second process 104 and so on (here all stored as processes table columns), has a process ID, here process 102 having process ID "1" 114 and process 104 having process ID "2" 116, for example. Here (FIGS. 4A, 4B), the first process 102 has a first processes table column entry 106 indicating "A" which specifies that a work item is first to be worked on at node A 142. A second processes table column entry 108 indicates "B" which specifies that the work item should be transferred to node B 144 after node A 142. A third processes table column entry 110 indicates "D" which specifies that the work item should be transferred to node D 168 after node B 144. A fourth processes table column entry 12 indicates "F" which specifies that the work item should be transferred to node F 210 (FIG. 6B) after node D 168. Described in more detail below, each node A–H (here all stored as nodes table columns as shown in FIGS. 4B) may represent a department (such as a purchasing department) responsible for a particular manipulation task in processing the work item. The second process 104 (FIG. 4A) similarly specifies the transfer of a work item from node A 142 to node C 164 to node D 168 to node E 170. Thus, each process, here process 102 (FIG. 4A) for example, defines a sequence of nodes (FIG. 6A) for manipulating a work item in the workflow system 15. Each process (102, 104 and so on) also has a process delete marking column entry (118, 120, and so on) (to be described below), here process 102 having process delete marking column entry 118 and process 104 having process delete marking column entry 120.

As mentioned before, each entry of each process (e.g., entries 106, 108, 110, 112 of process 102) corresponds to a node representing a manipulation task (e.g., an overall responsibility of a department) in the sequence. For example (FIG. 4A), the process column entry 106 corresponds to node A 142 (FIG. 4B). If the process 102 involves the creation of a new client account, node A 142 may represent the submission of a new account application in computer form to the workflow system 15. Node B 144 may represent the approval of the new account application. Information for each node is stored in the nodes table 140 (FIG. 4B) which provides a repertoire (FIG. 6B) of nodes (142, 144, 146, 148, 150, and so on) available for use in processing work items 10. Each node has a corresponding node ID, here (FIG. 4B) node A 142 having node ID "A" 152, node B 144 having node ID "B" 154, node C 146 having node ID "C" 156, node D 148 having node ID "D", node E 150 having node ID "E" 160, and so on. Each node also has a corresponding node delete marking column entry (to be described below), here (FIG. 4B) node A 142 having node delete marking column entry 162, node B 144 having node delete marking column entry 164, node C 146 having node delete marking column entry 166, node D 148 having node delete marking column entry 168, node E 150 having node delete marking column entry 170, and so on.

Each node (142, 144, 146, 148, 150, and so on) shown in FIG. 4B may be used in more than one process shown in FIG. 4A. For example, the nodes table column 142 has multiple process utilization entries, here including process utilization entry 172 indicating "1" which specifies that node A 142 is used in process "1" 102, process utililization entry 174 indicating "2" which specifies that node A 142 is also used in process "2" 104, and process utilization entries 176 and 178 indicating "4" and "5" which specify that node A 142 is used, respectively, in process "4" and process "5" (neither shown in FIG. 4A). Node B 144 also has process utilization entries, here process utilization entry 180 indicating "1" which specifies that node B 144 is used in process "1" 102, process utilization entry 182 indicating "3" which specifies that node B 144 is used in process "3" (not shown), process utilization entry 184 indicating "6" which specifies that node B 144 is used in process "6" (not shown), process utilization entry 186 indicating "8" which specifies that node B 144 is used in process "8" (not shown), and so on. The other nodes C–H (FIGS. 4B and 6B) are similarly provided with process utilization entries.

Such multiple use of nodes (142, 144, 146, 148, 150, and so on) (FIG. 4B) by processes (FIG. 4A) occurs because more than one process may include a particular manipulation task represented by a particular node. For example, two different processes (such as processes "1" 102 and "2" 104) may require the submission of a new account application in computer form. In addition, such a submission task may be represented by a particular node, such as node A. Thus, in the processes table 100, node A 142 is represented in both processes "1" 102 and "2" 104, here by process column entry 106 in process "1" 102 and by process column entry 108 in process "2" 104. Although here node A 142 is represented at the beginning of both processes "1" 102 and "2" 104, it is not necessary that a node appearing in multiple processes be positioned similarly in each of the multiple processes.

Figure 4D:
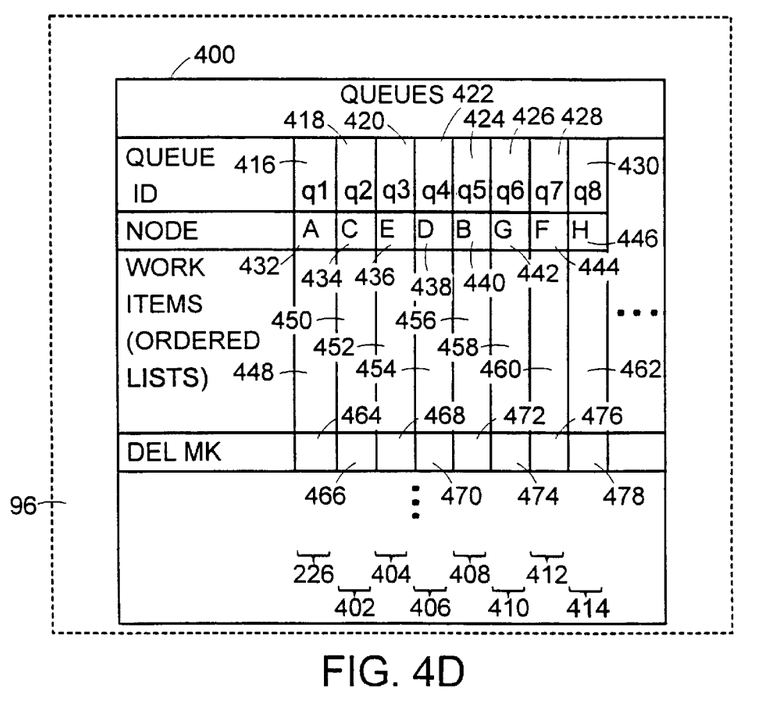
Figure 5:
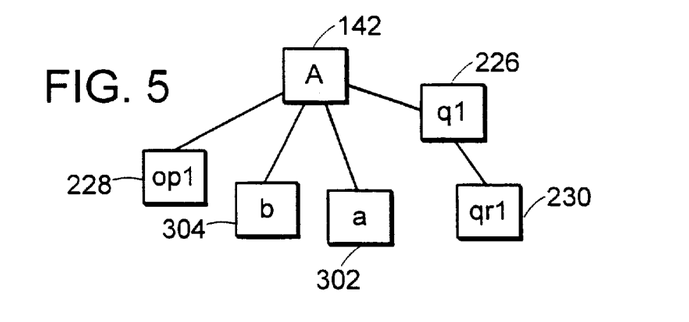
FIGS. 5, 6A–6B are diagrams useful for understanding the methods of FIGS. 1–2 according to the invention.
Figure 6A:
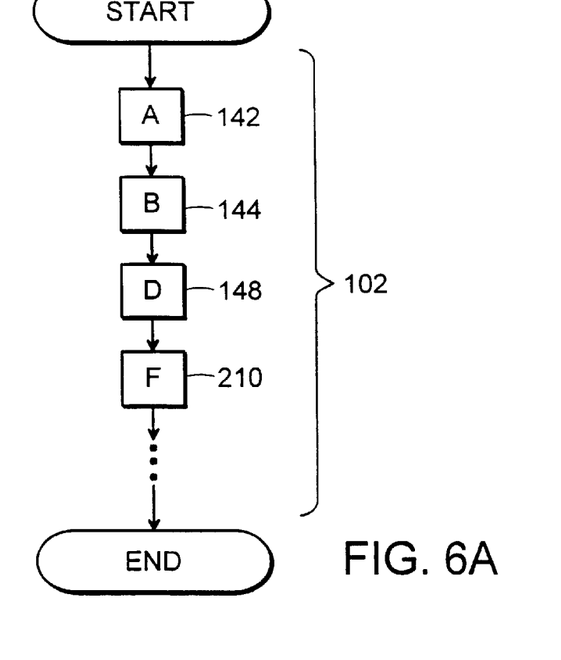

Referring now in particular to FIGS. 5, 6A, and 4C, each node, here node "A" 142 for example, is preferably associated not merely with one or more processes, here processsses "1" 102 and "2" 104 for example. Preferably, each node such as node "A" 142 is also associated with other workflow system components such as one or more rules, here (FIG. 4C) rules 302, 304, 350, 352, 358, 354, and 356 for example (including rules serving as work item definitions to affect how the work items 10 are displayed). In addition, each node such as node "A" 142 is preferably associated with one or more queues such as queue 226 (FIGS. 4D, 5) (described below), one or more operators, here exemplified by operator 228 (FIG. 5), and one or more queue rules, here exemplified by queue rule 230 (FIG. 5). Further, each node such as node "A" 142 is preferably associated with setup components (not shown) including but not limited to item-type codes, status codes, and value groups. Each such component is defined in an additional table in much the same way as queues and rules are defined in the queues table 400 and the rules table 300, described below.

The queues table 400 (FIG. 4D) stores queues, here exemplified by queues 226, 402, 404, 406, 408, 410, 412, 414. Each queue has a queue ID, here queue ID 416 "q1" identifying queue 226, queue ID 418 "q2" identifying queue 402, queue ID 420 "q3" identifying queue 404, queue ID 422 "q4" identifying queue 406, queue ID 424 "q5" identifying queue 408, queue ID 426 "q6" identifying queue 410, queue ID 428 "q7" identifying queue 412, and queue ID 430 "q8" identifying queue 414. In addition, referring now also to FIGS. 4B and 6B, each queue has a node utilization entry, here node utilization entry 432 indicating that queue 226 is used at node "A" 142, node utilization entry 434 indicating that queue 402 is used at node "C" 146, node utilization entry 436 indicating that queue 404 is used at node "E" 150, node utilization entry 438 indicating that queue 406 is used at node "D" 148, node utilization entry 440 indicating that queue 408 is used at node "B" 144, node utilization entry 442 indicating that queue 442 is used at node "G" 240 (FIG. 6B), node utilization entry 444 indicating that queue 412 is used at node "F" 210, and node utilization entry 446 indicating that queue 414 is used at node "H" 241. Each queue (FIGS. 4D, 5) provides an ordered list indicating work items 10 appropriate for execution at the node indicated by the node utilization entry, here ordered list 448 for node "A" 140, ordered list 450 for node "C" 146, ordered list 452 for node "E" 150, ordered list 454 for node "D" 148, ordered list 456 for node "B" 144, ordered list 458 for node "G" 240, ordered list 460 for node "F" 210, ordered list 462 for node "H" 241, and so on. Like the other tables 100, 140, 300 discussed before, the queues table 400 also has delete marking column entries, here queue delete marking column entry 464 for queue 226, queue delete marking column entry 466 for queue 402, queue delete marking column entry 468 for queue 404, queue delete marking column entry 470 for queue 406, queue delete marking column entry 472 for queue 408, queue delete marking column entry 474 for queue 410, queue delete marking column entry 476 for queue 412, queue delete marking column entry 478 for queue 414, and so on. For example, if node B 144 represents converting new account applications from non-standard formats to a standard format, ordered list 408 associated with node B 144 may list work items 10 representing new account applications submitted in non-standard formats. In such a case, after one of the nonstandard new account applications represented in the ordered list 408 is converted (e.g., by an operator), the next nonstandard new account application represented in the ordered list 408 is presented for conversion. Thus, in this example, non-standard new account applications are converted in order according to the ordered list 408.

Each setup component is used by an administrator (not shown) of the workflow system 15 to define how operators such as operator 228 may interact with a displayed work item 10. For example, the administrator may specify six status codes (including, e.g., "SUBMITTED", "AWAITING APPROVAL", and "COMPLETED") for indicating the progress of the work item 10 in the workflow system 15, but may also specify using one of the value groups to restrict the operator 228 to selecting from among only three of the six.

The rules table 300 includes information about each rule, here rules 302, 304, 350, 352, 358, 354, and 356 stored as rules table columns, of the workflow system 15. Just as each process, each node, and each queue has a process ID, a node ID, or a queue ID, respectively, each rule has a rule ID, here rule ID "a" 320 identifying rule 302, rule ID "b" identifying rule 322, and so on. Each of these rules affects how the workflow system 15 processes work items 10 meeting a predetermined criteria defined by the rule. Each rule defines its predetermined criteria in a "IF" portion of the rule, here "IF" portion 306 of rule 302, "IF" portion 308 of rule 304, and so on. A "THEN" portion of each rule, here "THEN" portion 310 of rule 302 and "THEN" portion 312 of rule 304, defines exactly how the rule affects the processing of work items 10 meeting the predetermined criteria of the "IF" portion. For example, "IF" portion 306 may direct rule "a" 222 to a specific type of new account application work items 10. If so, the "THEN" portion 310 of the rule "a" 302 may cause such new account application work items 10 to be displayed in a particular way or to be transferred to a particular node such as node B.

Each rule includes one or more node utilization column entries, here rule "a" 302 having node utilization column entries 314 and 316, rule "b" 304 having node utilization entry 318, and so on, associating the corresponding rule with one or more nodes such as node A and node B, much as the process utilization entries 172, 174, 180, and so on, of the nodes table 140 associated the nodes with processes. For example, node utilization entry 314 indicates "A" which specifies that rule "a" 302 is associated with node A 142, node utilization entry 316 indicates "B" which specifies that rule "a" 302 is also associated with node B 144, and node utilization entry 314 indicates "A" which specifies that rule "b" 304 is associated with node A 142, and so on.

One or more queue utilization column entries (not shown) may similarly be used in one or more of the rules a–g, such as the rules 302, 304, to associate one or more of the rules with one or more queues such as queue "q1" 226. Thus, use of one or more of the rules a-g may be restricted to work items 10 or components 228, 230, 236 associated with the node such as node A 142 or the queue "q1" 226. Each rule also includes a rule delete marking column entry (to be described below), here rule 302 having rule delete marking column entry 324, rule 304 having rule delete marking column entry 326, and so on.

The other components 228, 230 and the setup components are similarly associated with one or more nodes and with corresponding delete marking column entries.

Referring again to FIG. 1, in the computer system executable method, one of the memories 90, 92, 94 stores a definitional data item being any data structure (such as one of the processes, nodes, rules, or queues 102, 104, 142, 144, 146, 148, 150, 302, 304 or setup components) defining at least a part of the operation of the workflow system 15 (step 500). It is determined that the definitional data item should be removed from the one of the memories 90, 92, 94 (step 510). Such a determination is made by receiving from the administrator a directive indicating that the definitional data item is to be deleted. The administrator may issue such a directive by using an input device such as a computer mouse (not shown) or a computer keyboard 13 at one of the computer stations 12. Using the mouse or keyboard 13, the administrator selects the definitional data item from a list of such items displayed at the computer station 12 by the workflow system 15. After such a selection is made, the administrator receives an immediate acknowledgement of the selection for deletion.

The definitional data item (such as one of the processes, nodes, rules, or queues 102, 104, 142, 144, 146, 148, 150, 302, 304 or setup components) is retained in the memory (such as one of the memories 90, 92, 94) until the workflow system becomes sufficiently independent of the definitional data item (step 520). Such sufficient independence may be achieved in two ways. Depending on the particular characteristics of the definitional data item, only one of the ways or both ways may be required for the workflow system to become sufficiently independent of the definitional data item.

In the first way of achieving sufficient independence, the workflow system 15 becomes sufficiently independent of the definitional data item when another definitional data item becomes sufficiently independent of the definitional data item. For example, the workflow system 15 may become sufficiently independent of the node A 142 when the process "1" 102 becomes sufficiently independent of the node A 142 (e.g., when the process "1" 102 is no longer linked with the node A 142). In such a case, the process column entry 106 (indicating node A 142) serves as a reference using the node ID 152 (also indicating node A 142) to link the process "1" 102 to the node A 142. Thus, the node A 142 becomes sufficiently independent of the process "1" 102 when the process column entry 106 is removed or is changed to indicate other than node A.

In the second way of achieving sufficient independence, the workflow system 15 becomes sufficiently independent of the definitional data item when the workflow system 15 has fewer than a predetermined quantity of pending work items (e.g., one pending work item) meeting the predetermined criteria (such as the "IF" portion 306 of the rule 302). As mentioned above, if the definitional data item is one of the rules 302, 304, the predetermined criteria are defined in the "IF" portion 306, 308 of the information for one of the rules 302, 304. Thus, for example, rule "a" 302 may be directed by the "IF" portion 306 to any pending new account application work items 10 and the workflow system 15 may have at least the predetermined quantity of the pending new account application work items 10. If so, the workflow system 15 is not sufficiently independent of the rule "a" 302.

If the administrator directs the workflow system 15 to create a new definitional data item (not shown) having the same characteristics as the definitional data item (step 530), the definitional data item may be used as the new definitional data item (step 540). For example, the administrator may specify status codes (i.e., definitional data items) "DONE" and "OK" and then may issue a directive indicating that the "DONE" status code is to be removed. Subsequently in such a case, if the administrator then specifies a new status code "DONE", the existing to-be-removed "DONE" status code is used as the new status code "DONE", thus conserving processing resources.

Assuming that no such re-use occurs and that the workflow system 15 becomes sufficiently independent of the definitional data item (e.g., when the process "1" 102 is no longer linked with the node A 142 or when the workflow system 15 runs out of pending work items meeting the predetermined criteria such as the "IF" portion 306 of the rule 302), the definitional data item is removed from the one of the memories 90, 92, 94 (step 550). Such determinations about sufficient independence and such removal are preferably conducted in accordance with a batch program configured to run regularly (e.g., nightly) to remove definitional data items indicated for removal.

Figure 2:
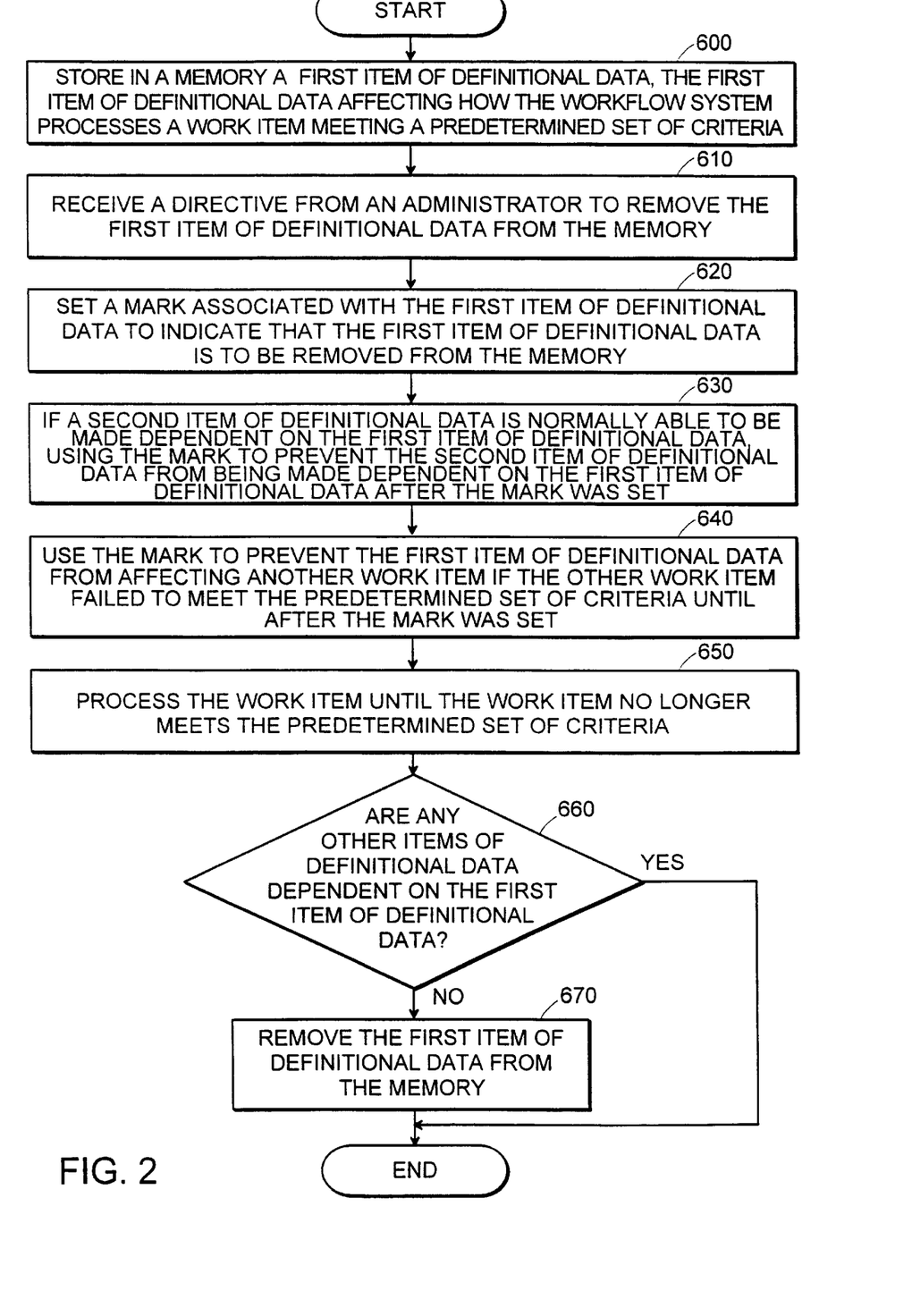

Now referring also to FIG. 2, a particular example is described in connection with the steps shown in FIG. 2. The rule "a" 302 is stored in the rules table 300 as discussed before (step 600). The rule "a" 302 affects how the workflow system 15 processes work items 10 meeting the predetermined criteria of the "IF" portion 306. A directive is received from an administrator to remove the rule "a" 302 (step 610). A mark is set in the rule delete marking column entry 324 (step 620). The mark indicates that the rule "a" 302 is to be removed.

Figure 6B:
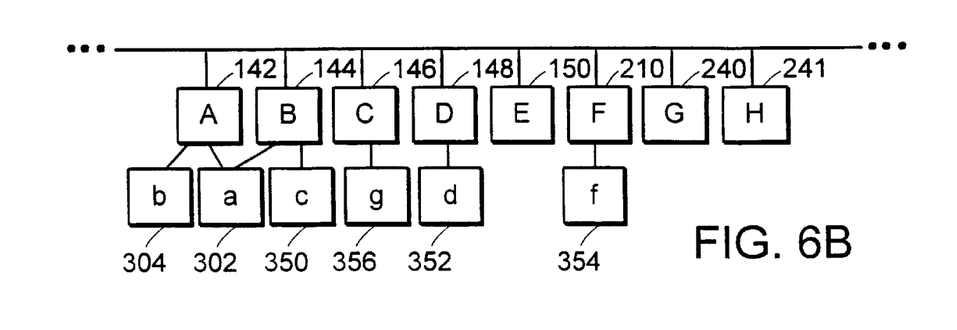

After the mark is set, the mark is used to prevent another definitional data item (such as a preselected data structure associated with node G 240) from being made dependent on the rule "a" definition table column 302 (step 630). For example, the administrator may wish to specify additional rules to be associated with node G 240. If so, the workflow system 15 provides a display list indicating available rules to the administrator. Due to the mark, this list omits to indicate the rule "a" 302 corresponding to the rule "a" 302. Thus in this example, the administrator is not able to associate the marked rule "a" 302 with node G 240.

The mark is also used to prevent the rule "a" 302 from affecting any work items 10 failing to meet the predetermined criteria until after the mark was set (step 640). For example, the predetermined criteria of the "IF" portion 306 may specify that the rule "a" 302 is directed to unapproved new account application work items 10. If so, the rule "a" 302 is permitted to affect only unapproved new account application work items 10 pending before the mark was set. Thus, in this example, even though the rule "a" 302 has not yet been removed, the corresponding rule "a" 302 is not permitted to affect any unapproved new account application work items 10 becoming available after the mark was set.

Any work items 10 meeting the predetermined criteria before the mark was set are then processed in the workflow system 15 until there are no work items 10 meeting the predetermined criteria for the rule "a" 302 (step 650). For example, if the rule "a" 302 is directed as described above only to unapproved new account application work items 10 pending before the mark was set, approval of all such pending unapproved new account application work items 10 leaves no work items 10 meeting the predetermined criteria.

Cases involving non-rule-related predetermined sets of criteria are resolved similarly. For example, if the definitional data item is associated with the operator "op1" 228, work items indicated in a personal queue (not shown) for the operator 228 before the mark was set are processed until the personal queue is empty (step 650). In another example, if the definitional data item is associated with the process 200, the same is true of work items already traversing the workflow system 15 in accordance with the process 200 before the mark was set (step 650).

It is determined whether any other definitional data items are dependent on the rule "a" 302 (step 660). This determination is made by searching for other data structures having references to the rule "a" 302. If the other definitional data item such as the node A 142 has no reference to the rule "a" 302, it is initially determined that the node A 142 is sufficiently independent on the rule "a" 302.

However, in general, if a particular data structure (such as the node "A" 142) is marked for removal, all lower-level data structures (such as those relating to the operator "op1" 228, the queue "q1" 226, and the queue rule "qr1" 230) referring to the particular data structure are also indirectly marked for removal. For example, marking the node "A" 142 for removal indirectly marks the rule "a" 302 also for removal. Thus, such an indirect marking may be the cause of the rule "a" 302 being marked for removal. If so, because the node utilization column entries 314, 316 indicate that rule "a" 302 is shared for use at both nodes A and B, the node B 144 is determined to be insufficiently independent on the rule "a" 302. On the other hand in such a case, no definitional data item is determined to be dependent on the other lower-level data structures such as those relating to the operator "op1" 228, the queue "q1" 226, and the queue rule "qr1" 230, assuming that these other lower-level data structures 228, 226, 230 are not shared.

Depending on the outcome of the determination about dependency, the rule "a" 302 is then removed from the memory (step 670).

The steps described above in connection with the rule "a" 302 also apply to all other definitional data items having delete marking column entries such as the process-, node-, and other rule-related entries 118, 120, 162, 164, 166, 168, 170, 304.

The technique (i.e., the methods described above) may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the determination that the definitional data item should be removed from the one of the memories 90, 92, 94 need not rely exclusively on the administrator. The workflow system may make such a determination automatically or semi-automatically. Such an automatic or semi-automatic determination may depend on an automatic analysis of memory resources statistics or of one or more characteristics of the definitional data item, such as the history of use of the definitional data item and any existing dependencies on the definitional data item.

What is claimed is:

1. A computer system executable method for use in an automated workflow system, the method comprising
    determining that a definitional data item should be removed from a memory, the definitional data item defining at least a part of the operation of the workflow system; and
    retaining the definitional data item in the memory until the workflow system becomes sufficiently independent of the definitional data item.

2. The method of claim 1, wherein the workflow system becomes sufficiently independent of the definitional data item when another definitional data item becomes sufficiently independent of the definitional data item.

3. The method of claim 2, wherein at least one of the definitional data items has an identifier;
    a reference using the identifier links one of the definitional data items to the other definitional data item; and
    the other definitional data item becomes sufficiently independent of the definitional data item when the reference is removed.

4. The method of claim 3, wherein a nodes table comprises the definitional data item.

5. The method of claim 4, wherein a processes table comprises the other definitional data item.

6. The method of claim 3, wherein a rules table comprises the definitional data item.

7. The method of claim 6, wherein a nodes table comprises the other definitional data item.

8. The method of claim 3, wherein a work items table comprises the definitional data item.

9. The method of claim 8, wherein a rules table comprises the other definitional data item.

10. The method of claim 2, wherein the method further comprises using the definitional data item as a new definitional data item.

11. The method of claim 1, wherein the workflow system becomes sufficiently independent of the definitional data item when the workflow system has fewer than a predetermined quantity of work items requiring use of the definitional data item.

12. The method of claim 11, wherein the predetermined quantity is one.

13. The method of claim 11, wherein the definitional data item defines predetermined criteria and the work items require use of the definitional data item if the work items meet the predetermined criteria.

14. The method of claim 11, wherein
    a rules table comprises the definitional data item; and
    the predetermined criteria are defined at least in part by the definitional data item.

15. A computer system executable method for use in an automated workflow system, the method comprising
    storing in a memory a definitional data item, the definitional data item defining at least a part of the operation of the workflow system;

determining that the definitional data item should be removed from the memory;

retaining the definitional data item in the memory until the workflow system becomes sufficiently independent of the definitional data item; and removing the definitional data item from the memory.

16. A computer system executable method for an automated workflow system for manipulating a work item, the work item being stored in a database of work items for subsequent execution by an operator, the work item meeting a predetermined criteria, the method comprising storing in a memory a first definitional data item, the first definitional data item affecting how the workflow system processes work items meeting the predetermined criteria;

receiving a directive from an administrator to remove the first definitional data item from the memory;

setting a mark associated with the first definitional data item to indicate that the first definitional data item is to be removed from the memory;

if a second definitional data item is normally able to be made dependent on the first definitional data item, using the mark to prevent the second definitional data item from being made dependent on the first definitional data item after the mark was set;

using the mark to prevent the first definitional data item from affecting another work item if the other work item failed to meet the predetermined criteria until after the mark was set;

processing the work item until the work item no longer meets the predetermined criteria;

determining whether any other definitional data items are dependent on the first definitional data item; and depending on the outcome of the determination, removing the first definitional data item from the memory.

17. A computer system executable method for use in processing work items in an automated workflow system, the method comprising storing in a memory a definitional data item, the definitional data item affecting how the workflow system processes the work items;

setting a mark associated with the definitional data item to indicate that the definitional data item is to be removed from the memory;

using the mark to prevent the definitional data item from affecting one of the work items;

processing the one of the work items; and removing the definitional data item from the memory.

18. The method of claim 17, wherein the method further comprises using the mark to prevent the definitional data item from being associated with another definitional data item.

19. Computer software, residing on a computer-readable storage medium, comprising instructions for use in a computer system in an automated workflow system, the instructions causing the computer system to:

determine that a definitional data item should be removed from a memory, the definitional data item defining at least a part of the operation of the workflow system; and retain the definitional data item in the memory until the workflow system becomes sufficiently independent of the definitional data item.

20. The computer software of claim 19, wherein the workflow system becomes sufficiently independent of the definitional data item when another definitional data item becomes sufficiently independent of the definitional data item.

21. The computer software of claim 20, wherein at least one of the definitional data items has an identifier;

a reference using the identifier links one of the definitional data items to the other definitional data item; and the other definitional data item becomes sufficiently independent of the definitional data item when the reference is removed.

22. The computer software of claim 21, wherein a nodes table comprises the definitional data item.

23. The computer software of claim 22, wherein a processes table comprises the other definitional data item.

24. The computer software of claim 21, wherein a rules table comprises the definitional data item.

25. The computer software of claim 24, wherein a nodes table comprises the other definitional data item.

26. The computer software of claim 21, wherein a work items table comprises the definitional data item.

27. The computer software of claim 26, wherein a rules table comprises the other definitional data item.

28. The computer software of claim 20, wherein the computer software further comprises instructions causing the computer system to use the definitional data item as a new definitional data item.

29. The computer software of claim 19, wherein the workflow system becomes sufficiently independent of the definitional data item when the workflow system has fewer than a predetermined quantity of pending work items meeting a predetermined criteria.

30. The computer software of claim 29, wherein the predetermined quantity is one.

31. The computer software of claim 29, wherein a rules table comprises the definitional data item; and the predetermined criteria are defined at least in part by the definitional data item.

32. Computer software, residing on a computer-readable storage medium, comprising instructions for use in a computer system in an automated workflow system, the instructions causing the computer system to:

store in a memory a definitional data item, the definitional data item defining at least a part of the operation of the workflow system;

determine that the definitional data item should be removed from the memory;

retain the definitional data item in the memory until the workflow system becomes sufficiently independent of the definitional data item; and remove the definitional data item from the memory.

33. Computer software, residing on a computer-readable storage medium, comprising instructions for use in a computer system in an automated workflow system for manipulating a work item, the work item being stored in a database of work items for subsequent execution by an operator, the instructions causing the computer system to:

store in a memory a first definitional data item, the first definitional data item affecting how the workflow system processes work items meeting predetermined criteria;

receive a directive from an administrator to remove the first definitional data item from the memory;

set a mark associated with the first definitional data item to indicate that the first definitional data item is to be removed from the memory;

if a second definitional data item is normally able to be made dependent on the first definitional data item, use the mark to prevent the second definitional data item from being made dependent on the first definitional data item after the mark was set;

use the mark to prevent the first definitional data item from affecting another work item if the other work item failed to meet the predetermined criteria until after the mark was set;

process the work item until the work item no longer meets the predetermined criteria;

determine whether any other definitional data items are dependent on the first definitional data item; and depending on the outcome of the determination, remove the first definitional data item from the memory.

34. Computer software, residing on a computer-readable storage medium, comprising instructions for use in a computer system for use in processing work items in an automated workflow system, the instructions causing the computer system to:

store in a memory a definitional data item, the definitional data item affecting how the workflow system processes the work items;

set a mark associated with the definitional data item to indicate that the definitional data item is to be removed from the memory;

use the mark to prevent the definitional data item from affecting one of the work items;

process the one of the work items; and remove the definitional data item from the memory.

35. The computer software of claim 34, wherein the computer software further comprises instructions causing the computer system to use the mark to prevent the definitional data item from being associated with another definitional data item.

* * * * *